(12) United States Patent
Yamanaka

(10) Patent No.: US 7,347,173 B2
(45) Date of Patent: Mar. 25, 2008

(54) VALVE TIMING CONTROL SYSTEM FOR INTERNAL COMBUSTION ENGINE

(75) Inventor: Atsushi Yamanaka, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/607,920

(22) Filed: Dec. 4, 2006

(65) Prior Publication Data

US 2007/0074693 A1    Apr. 5, 2007

Related U.S. Application Data

(63) Continuation of application No. 11/011,061, filed on Dec. 15, 2004, now Pat. No. 7,143,730.

(30) Foreign Application Priority Data

Dec. 19, 2003   (JP) .............................. 2003-422267

(51) Int. Cl.
  *F01L 1/34* (2006.01)
(52) U.S. Cl. ............... 123/90.17; 123/90.15; 123/90.16; 123/90.11; 464/1; 464/2; 464/29; 464/160
(58) Field of Classification Search .............. 123/90.17
  See application file for complete search history.

(56) References Cited

U.S. PATENT DOCUMENTS

| | | | |
|---|---|---|---|
| 6,439,184 B1 | 8/2002 | Takenaka et al. | |
| 6,502,537 B2 | 1/2003 | Todo et al. | |
| 6,532,922 B2 | 3/2003 | Komazawa | |
| 6,675,754 B2 * | 1/2004 | Watanabe et al. | ........ 123/90.17 |
| 6,805,081 B2 | 10/2004 | Watanabe et al. | |
| 6,805,082 B2 | 10/2004 | Takenaka et al. | |
| 6,832,585 B2 | 12/2004 | Watanabe | |
| 6,848,401 B2 | 2/2005 | Takenaka et al. | |
| 6,920,855 B2 | 7/2005 | Takenaka et al. | |

FOREIGN PATENT DOCUMENTS

JP    2001-41013 A    2/2001

* cited by examiner

*Primary Examiner*—Thomas Denion
*Assistant Examiner*—Kyle M. Riddle
(74) *Attorney, Agent, or Firm*—Foley & Lardner LLP

(57) ABSTRACT

A valve timing system for an internal combustion engine includes a phase alteration mechanism interposed between a driving rotator and a driven rotator and having a direction turning point at which the phase alteration direction is reversed when a movable portion of the mechanism travels from a beginning to a termination, and an operation control device for displacing the movable portion when undergoing an energization control, the movable portion being displaced toward the beginning when the energization control fails to be carried out. The rotation phase is set at a middle position between a maximum retard position and a maximum advance position when the movable portion is located at the beginning.

17 Claims, 4 Drawing Sheets

VALVE TIMING CONTROL SYSTEM FOR INTERNAL COMBUSTION ENGINE

CROSS-REFERENCE TO RELATED APPLICATION

This application is a continuation of U.S. application Ser. No. 11/011,061, filed Dec. 15, 2004, now U.S. Pat No. 7,143,730, which is incorporated herein by reference in its entirety.

BACKGROUND OF THE INVENTION

The present invention relates to a valve timing control system for an internal combustion engine, which variably controls the opening/closing timing of an engine valve in accordance with the engine operating conditions.

Typically, the valve timing control system comprises a housing rotated by power of a crankshaft and a camshaft-side shaft member coaxially mounted thereto, wherein the mounting angle (rotation phase) between the two can be adjusted through links and a lever. Specifically, the housing is formed with radial grooves in which respective movable guides of the links arranged at distal ends are slidably engaged. A base end of each link is rotatably coupled to the lever protrusively provided to the shaft member. An operating rotator is disposed in front of the housing and the shaft member to be rotatable relative thereto. The backside of the operating rotator is formed with a spiral groove in which the movable guides of the links are engaged. The operating rotator is biased by a power spring in the engine rotating direction, and is subjected to a braking force of an electromagnetic brake as required, wherein the relative rotated position of the operating rotator with respect to the housing can be controlled by controlling energization of the electromagnetic brake.

With the valve timing control system, when the electromagnetic brake is not energized, the operating rotator is biased toward the most forward position in the engine rotating direction by the power spring, having the movable guides operated at a radially inside or outside end of the spiral groove. As a result, the housing and the shaft member are held at the maximum retard phase or the maximum advance phase through the links. Then, when the electromagnetic brake is energized, the operating rotator is operated in accordance with the balance between a biasing force of the power spring and a braking force of the electromagnetic brake, having the movable guides displaced radially while being guided by the spiral groove, thus adjusting the rotation phase between the housing and the shaft member through the links. The spiral of the spiral groove is formed to have the diameter reducing continuously from one end to another end.

SUMMARY OF THE INVENTION

The typical valve timing control system is constructed so that the operating rotator is operated in accordance with the balance between a biasing force of the power spring and a braking force of the electromagnetic brake. However, the spiral of the spiral groove is formed to have the diameter reducing continuously from one end to another end, so that when the electromagnetic brake is turned off, which occurs at engine start or standstill, for example, the operating rotator is biased in one direction by a biasing force of the power spring only, having the movable guides moved up to the radially outside or inside end along the spiral of the spiral groove. Since movement of the movable guides up to the radially outside or inside end is involved in returning of the rotation phase between the housing and the shaft member up to the maximum retard position or the maximum advance position, the rotation phase which allows engine start should inevitably be set at a position in the vicinity of the maximum retard position or the maximum advance position. Specifically, if the rotation phase which allows engine start is set at a middle position between the maximum retard position and the maximum advance position, engine restart cannot be carried out smoothly due to impossible natural returning of the rotation phase to the middle position at engine start or during inertia rotation after engine stop. Thus, the typical valve timing control system does not allow, during engine operation, effective use of the phase area shifted to the more advanced or retardant position with respect to the rotation phase which allows engine start.

It is, therefore, an object of the present invention to provide a valve timing control system for an internal combustion engine, which allows, during engine operation, effective use of the phase area shifted to the more advanced or retardant position with respect to the rotation phase which allows engine start.

Generally, the present invention provides a system for controlling a valve timing for an internal combustion engine, which comprises: a driving rotator which is rotated by a crankshaft of the engine; a driven rotator which follows the driving rotator, the driven rotator causing rotation transmitted to a camshaft; a phase alteration mechanism interposed between the driving rotator and the driven rotator, the phase alteration mechanism comprising a movable portion, the movable portion traveling between a beginning and a termination to cause relative rotation between the driving rotator and the driven rotator, the phase alteration mechanism having a direction turning point at which a phase alteration direction is reversed when the movable portion travels from the beginning to the termination; and an operation control device which displaces the movable portion of the phase alteration mechanism when undergoing an energization control, the movable portion being displaced toward the beginning when the energization control fails to be carried out, wherein a rotation phase is set at a middle position between a maximum retard position and a maximum advance position when the movable portion is located at the beginning.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
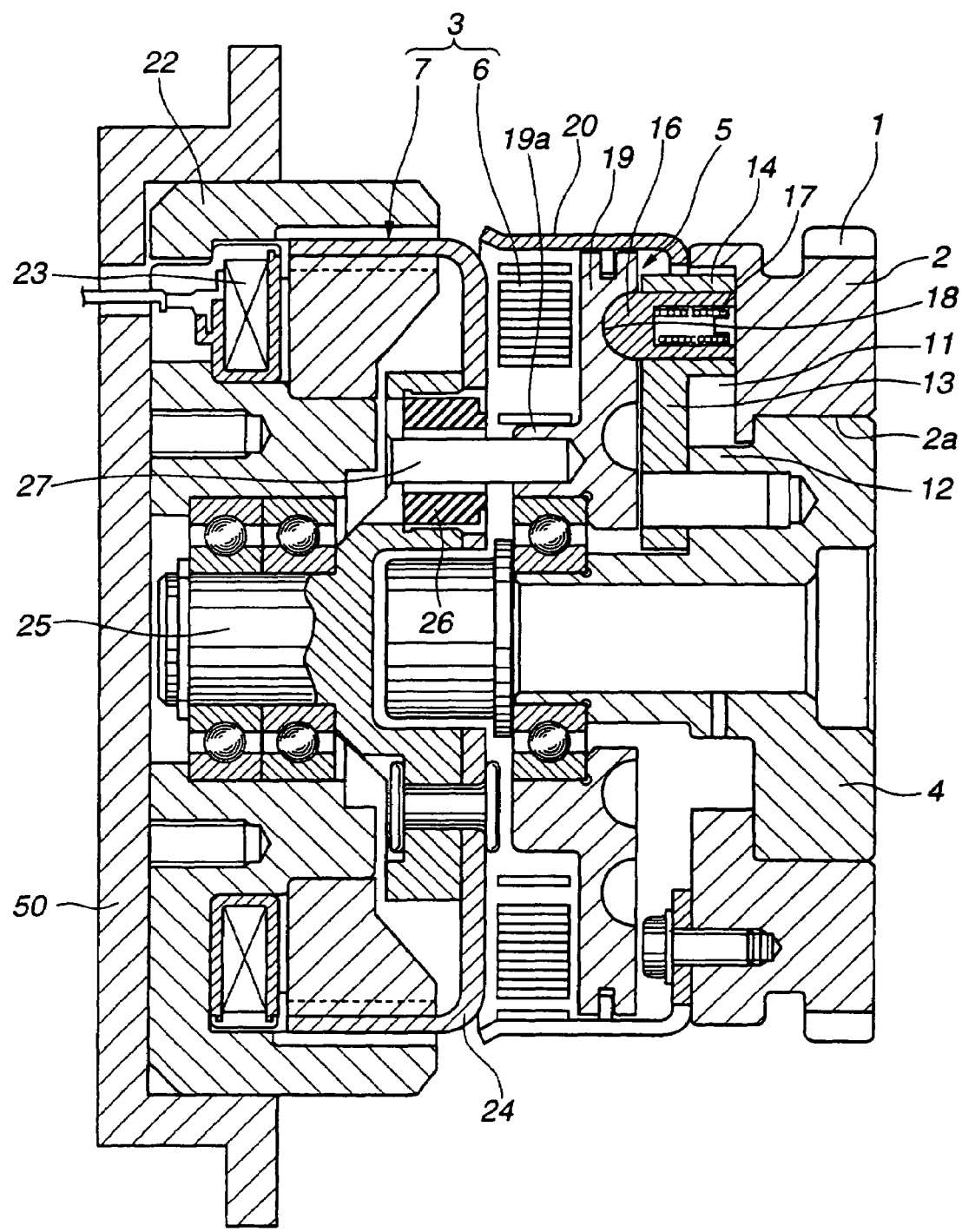
FIG. 1 is a longitudinal sectional view showing an embodiment of a valve timing control system for an internal combustion engine according to the present invention.

Referring to the drawings, a description will be made about a preferred embodiment of a valve timing control system for an internal combustion engine according to the present invention. In the illustrative embodiment, the present invention is applied to an intake-side valve actuating system. Optionally, the present invention can be applied to an exhaust-side valve actuating system.

Referring to FIG. 1, the valve timing control system is disposed at a front end of a camshaft, not shown, rotatably supported on a cylinder head of the engine, and comprises a driving ring (driving rotator) 2 including at the outer periphery a timing sprocket 1 linked to a crankshaft, not shown, a driven shaft member (driven rotator) 4 integrally coupled to the front end of the camshaft and for relatively rotatably supporting driving ring 2 through the base-side outer periphery, a phase alteration mechanism 5 disposed in front of (on the left side of) driving ring 2 for operating the mounting angle between driving ring 2 and driven shaft member 4, an operation control means or device 3 disposed in front of phase alteration mechanism 5 and for controlling mechanism 5 in accordance with the engine operating conditions, and a VTC cover 50 attached to an engine block and for covering the front faces of the above components and their perimeters.

The intake-side rotation phase of the engine is arbitrarily controlled by the valve timing control system, wherein the rotation phase which allows engine start is set at a predetermined middle position between the maximum retard position and the maximum advance position.

Figure 2:
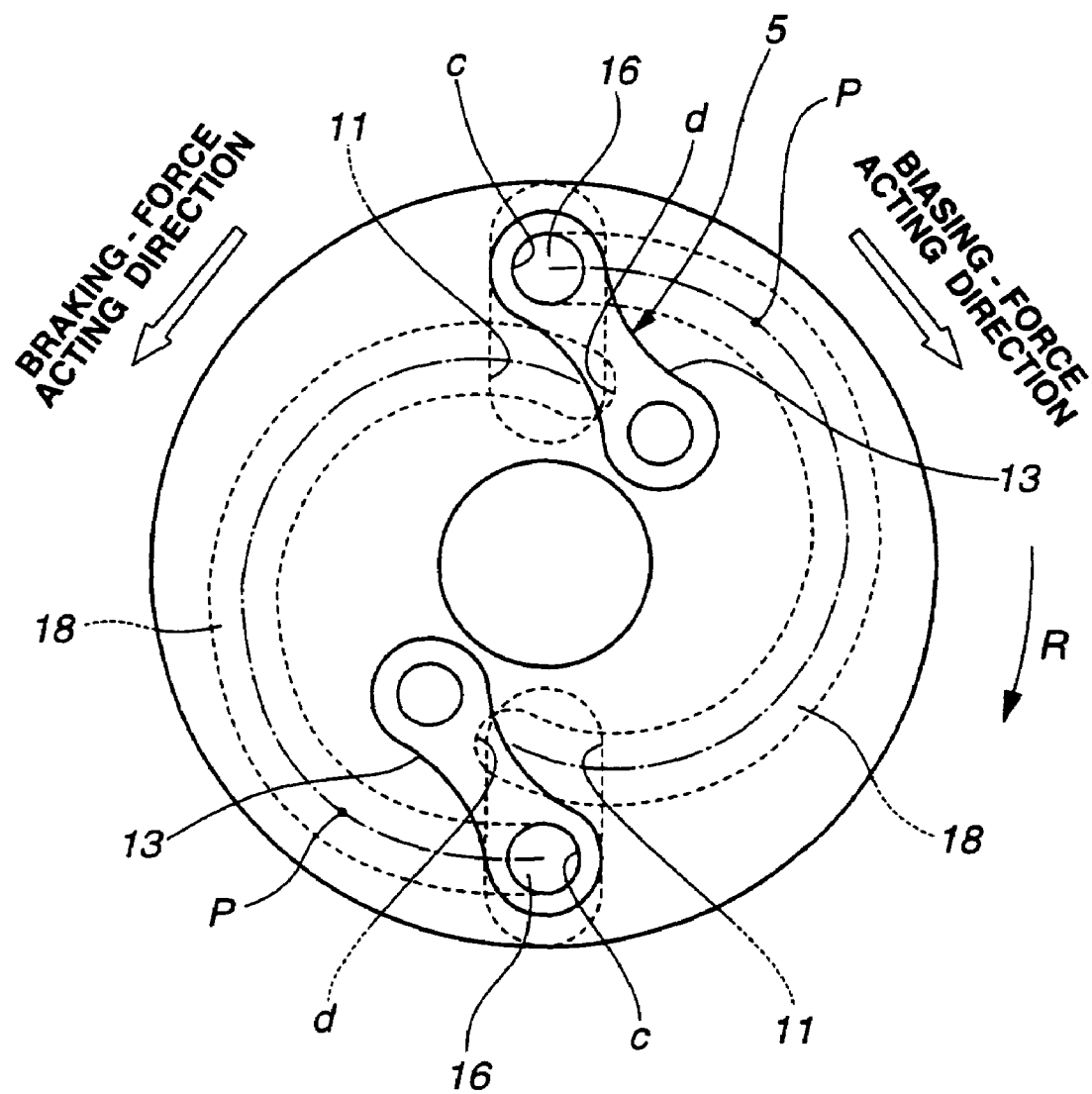
FIG. 2 is a schematic front view showing operation of links at the middle phase when no control is carried out.

Driving ring 2 is formed with a stepped insertion hole 2a which is rotatably engaged with the base-side outer periphery of driven shaft member 4. Referring particularly to FIG. 2, the front-end face of driving ring 2 has two radial grooves (radial guide) 11 formed to be axisymmetric and extend roughly radially.

Driven shaft member 4 has an increased diameter portion formed at the base-side outer periphery which abuts on the front end of the camshaft, and two levers 12 integrally formed with the outer peripheral surface in front of the increased diameter portion to protrude radially. A link 13 has a base end rotatably supported to each lever 12 through a pin, and a distal end integrally formed with a cylindrical protrusion 14 which slidably engages in corresponding radial groove 11.

Link 13 is swingably coupled to driven shaft member 4 with protrusion 14 engaging in corresponding radial groove 11. Thus, when the distal end of link 13 moves along radial groove 11 under an external force, driving ring 2 and driven shaft member 4 are rotated relative to each other by the action of link 13 and lever 12 in the direction and by an angle corresponding displacement of protrusion 14.

The distal end of link 13 is formed with an accommodation hole which opens to the axially front side. Accommodated therein are an engagement pin 16 engaged in a spiral groove (spiral guide) 18 as will be described later, and a coil spring 17 for biasing engagement pin 16 forward (to the side of spiral groove 18). In the illustrative embodiment, a movable guide which moves while being guided by radial groove 11 and spiral groove 18 is comprised of protrusion 14 and engagement pin 16 of the distal end of link 13, coil spring 17, and the like.

On the other hand, a spiral plate (operating rotator) 19 having on the backside a pair of spiral grooves (spiral guides) 18 of semicircular section is rotatably supported at a position in front of the protruding position of lever 12 of driven shaft member 4. Engagement pin 16 is rollingly guided and engaged in spiral groove 18 of spiral plate 19.

Figure 3:
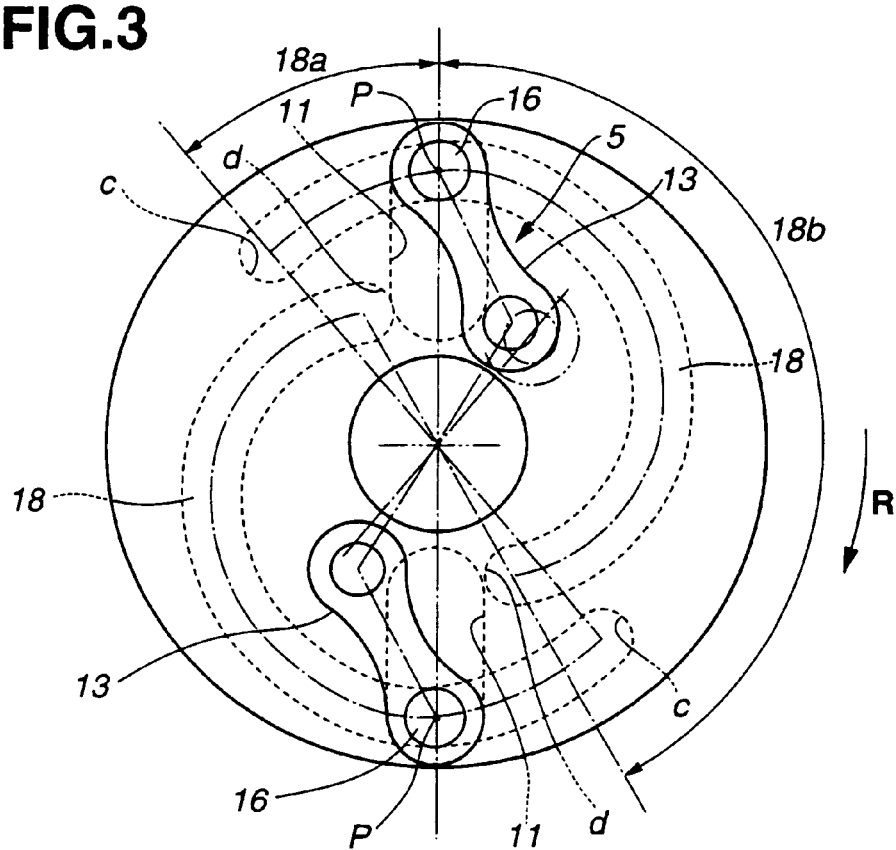
FIG. 3 is a view similar to FIG. 2, showing operation of the links at the maximum retard phase.

Spiral grooves 18 are formed in spiral plate 19 to be axisymmetric and of the same shape. Referring to FIG. 3, the spiral of spiral groove 18 includes an increasing area 18a in which the spiral diameter increases and a decreasing area 18b in which the spiral diameter decreases, when engagement pin 16 travels from one end to another end. A boundary of areas 18a, 18b constitutes a direction turning point P of the present invention. Therefore, when engagement pin 16 travels along the shape of spiral groove 18 from one end to another end, engagement pin 16 moves radially outward up to direction turning point P, and then moves radially inward up to another end of spiral groove 18. The radial variation range of increasing area 18a is set to be smaller than that of decreasing area 18b, and a beginning "c" (direction turning point P) and termination "d" of decreasing area 18b are set as a maximum radial position and minimum radial position. Beginning "c" of increasing area 18a (one end of spiral groove 18) is disposed offset slightly radially outward with respect to a radially middle position between the maximum radial position and the minimum radial position.

In the illustrative embodiment, the direction from one end of spiral groove 18 to another end is set as engine rotating direction R. Therefore, when spiral plate 19 rotates relative to driving ring 2 in the retard direction with engagement pin 16 engaged in spiral groove 18, the distal end of link 13 moves toward termination "d" of spiral groove 18 while being guided by radial groove 11. On the other hand, when spiral plate 19 rotates in the advance direction, the distal end of link 13 moves toward beginning "c" of spiral groove 18.

Figure 4:
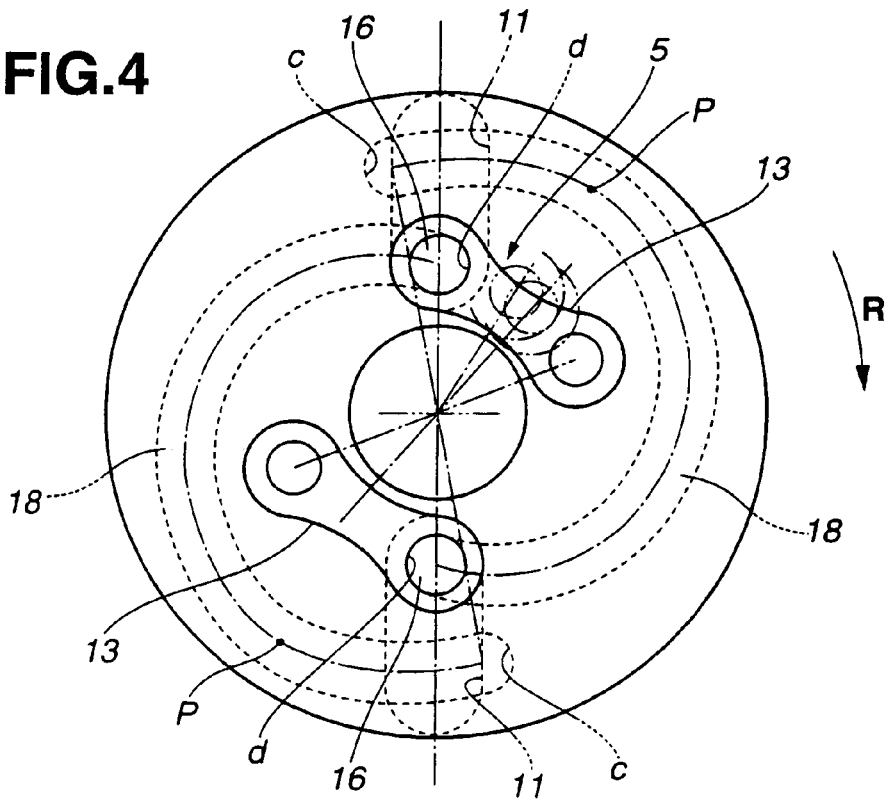
FIG. 4 is a view similar to FIG. 3, showing operation of the links at the maximum advance phase.

Phase alteration mechanism 5 is comprised of radial grooves 11 of driving ring 2, links 13, protrusions 14, engagement pins 16, levers 12, spiral plate 19, spiral groove 18, and the like. Phase alteration mechanism 5 is constructed such that when operation control means 3 provides to spiral plate 19 an operating force in the rotating direction, the operating force urges to radially displace the distal ends of links 13 through engaged portions of spiral groove 18 and engagement pins 16. Then, a relative torque is provided to driving ring 2 and driven shaft member 4 by the action of links 13 and levers 12. FIG. 2 shows a state of phase alteration mechanism 5 at the middle phase when no control is carried out, and FIGS. 3 and 4 show states of phase alteration mechanism 5 at the maximum retard phase and the maximum advance phase, respectively, when control is carried out.

A cylindrical wall 20 is arranged at a front end of driving ring 2 to cover links 13 and the outer periphery of spiral plate 19. A cylindrical small-diameter base 19a is integrally formed with spiral plate 19 to protrude forward. A power spring (biasing means or device) 6 is accommodated in a space between cylindrical wall 20 and small-diameter base 19a. Power spring 6 has ends caught on small-diameter base 19a and cylindrical wall 20, respectively, to provide from cylindrical wall 20 to spiral plate 19 a biasing force in engine rotating direction R.

A hysteresis brake (electromagnetic actuator) 7 is disposed in front of spiral plate 19 and power spring 6. Hysteresis brake 7 is controlled in energization by an electric control unit (ECU), not shown, to provide a braking force to spiral plate 19 as required. Hysteresis brake 7, ECU, and power spring 6 constitute an operation control means or device 3. In accordance with a balance with a biasing force of power spring 6 acting on spiral plate 19, hysteresis brake 7 controls the rotation phase of spiral plate 19 with respect to driving ring 2.

As shown in FIG. 1, hysteresis brake 7 comprises a magnetic induction member 22 fixed to VTC cover 50 which is a non-rotary member and having a pair of peripheral faces opposite to each other across a roughly cylindrical clearance, inner and outer pole teeth, not shown, arranged on the respective peripheral faces, an electromagnetic coil 23 mounted to magnetic induction member 22 and for generating a magnetic field between the inner pole teeth and the outer pole teeth in accordance with applied current, and a bottomed cylindrical braking rotor 24 interposed between the inner and outer pole teeth in a non-contact way. Electromagnetic coil 23 is controlled in energization by the ECU.

The inner and outer pole teeth comprise a plurality of pole-teeth elements extending axially, respectively, which are disposed offset circumferentially with respect to each other. Therefore, when electromagnetic coil 23 is energized, a magnetic field is generated between the corresponding pole-teeth elements of the inner and outer pole teeth.

Braking rotor 24 is made of a hysteresis material having magnetic hysteresis characteristic. Braking rotor 24 at the inner peripheral edge is supported by magnetic induction member 22 through a shaft member 25, and is coupled to spiral plate 19 through a rubber bush 26 and a coupling pin 27 to be rotatable together. With hysteresis brake 7, therefore, when a magnetic field is generated between the inner and outer pole teeth by energization of electromagnetic coil 23, braking rotor 24 undergoes a braking force in accordance with applied current, thus decelerating spiral plate 19.

When hysteresis brake 7 is not controlled in energization, spiral plate 19 is urged to move forward in the rotating direction under a force of power spring 6 only. As a result, at engine start (cranking) or during inertia rotation after engine stop, spiral plate 19 is maximally displaced forward in the rotation direction. Then, engagement pin 16 of the distal end of links 13 is displaced to beginning "c" of increasing area 18a over direction turning point P of spiral groove 18 as shown in FIG. 2. Since beginning "c" of increasing area 18a is the radial position between the maximum radial position and the minimum radial position as described above, the rotation phase between driving ring 2 and driven shaft member 4 operated through links 13 becomes middle position which allows engine start.

Therefore, during engine cranking, the rotation phase is maintained at the middle position which allows engine start, obtaining sure engine start. Maintaining of the middle phase at engine start is carried out without relying on a force of hysteresis brake 7, so that even if hysteresis brake 7 causes a failure such as disconnection, at least engine start can be ensured.

Figure 5:
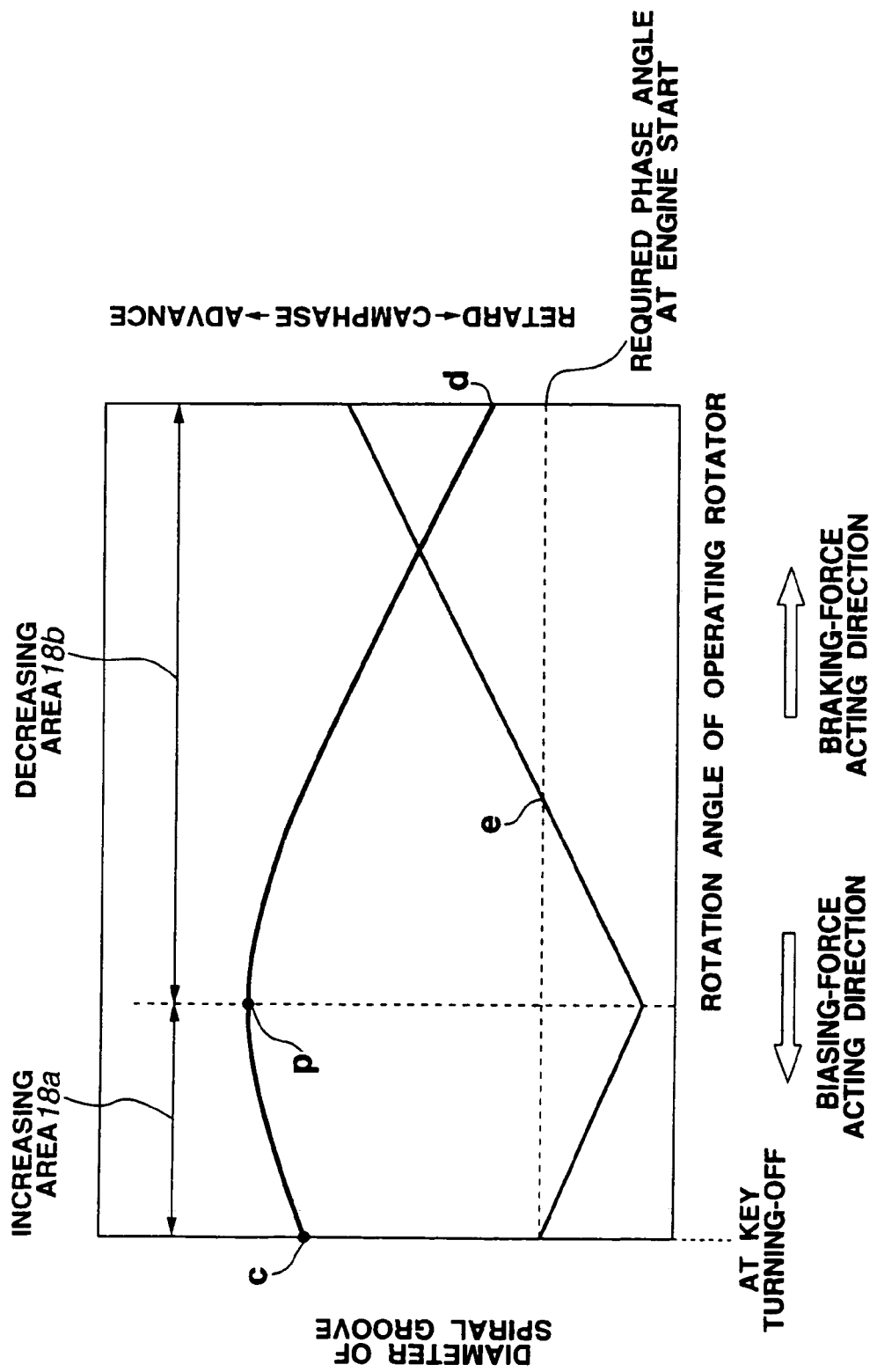
FIG. 5 is a graph illustrating the relationship between the rotation angle of an operating rotator, the diameter of a spiral groove, and the cam phase.

After engine start, the ECU starts to carry out phase control. Immediately after engine start, hysteresis brake 7 is energized to rotate spiral plate 19 the backward direction so that engagement pin 16 of the distal end of link 13 moves into decreasing area 18b of spiral groove 18 over direction turning point P. Specifically, spiral plate 19 is rotated so that engagement pin 16 moves to the same radial position (point "e" in FIG. 5) in decreasing area 18b as that of beginning "c" in increasing area 18a.

Then, when changing the rotation phase therefrom to the retardant position, current to be applied to hysteresis brake 7 is decreased to rotate spiral plate 19 in the forward direction, moving engagement pin 16 of the distal end of link 13 toward direction turning point P of decreasing area 18b of spiral groove 18 as shown in FIG. 3. With this, the distal end of link 13 moves radially outward to change the rotation phase between driving ring 2 and driven shaft member 4 to the retardant position. It is noted that the ECU carries out energization control of hysteresis brake 7 within the range that engagement pin 16 does not move over direction turning point P at all times.

When changing the rotation phase to the advanced position, current to be applied to hysteresis brake 7 is increased to rotate spiral plate 19 in the backward direction, moving engagement pin 16 of the distal end of link 13 toward termination "d" of spiral groove 18 as shown in FIG. 4. With this, the distal end of link 13 moves radially inward to change the rotation phase between driving ring 2 and driven shaft member 4 to the advanced position.

When turning off the ignition key at engine stop, energization control of hysteresis brake 7 is not carried out, so that spiral plate 19 is rotated in the forward direction under a force of power spring 6, returning the rotation phase to the middle position during engine inertia operation. However, a case that the rotation phase does not return completely to the middle position can be supposed according to the situation of engine stop. In the illustrative embodiment, even in such case, the rotation phase can be returned to the middle position at cranking as described above, obtaining sure engine restart.

As described above, in the illustrative embodiment, the ingenious design of the shape of spiral groove 18 allows the rotation phase to naturally be returned to the middle position when no control is carried out, obtaining sure engine start in the middle phase without requiring any addition of complicated mechanisms. Therefore, the phase area shifted to the more retardant or advanced position with respect to the middle position can be used during engine operation. By way of example, during so-called hot idle where stable combustion is carried out, the intake valve is closed sufficiently late with respect to the bottom dead center so as to substantially reduce the compressibility, allowing enhancement in fuel consumption. Moreover, during acceleration in the engine high-rotation range, the intake valve is closed sufficiently late to enhance an air supercharging effect, resulting also in enhancement in engine output.

In the illustrative embodiment, the electromagnetic actuator includes hysteresis brake 7. Optionally, the electromagnetic actuator may be a frictional contact type electromagnetic brake or an electric motor. Further, in the illustrative embodiment, the biasing means includes power spring 6. Optionally, the biasing means may be other spring means such as torsion coil spring. Still further, in the illustrative embodiment, power transmission from the crankshaft to driving ring 2 is ensured by meshing of the chain and sprocket. Alternatively, power transmission can be ensured by meshing of the gears or frictional engagement of the belt and pulleys. Furthermore, in the illustrative embodiment, the driven rotator includes driven shaft member 4 directly coupled to the camshaft. Alternatively, the driven rotator may be camshaft itself, and driven shaft member 4 may be linked to the camshaft through a gear and the like.

As described above, according to the present invention, at engine start or during inertia rotation after engine stop, the rotation phase can naturally be returned to the middle position due to guide operation of the spiral of the spiral guide, obtaining setting of the rotation phase which allows engine start at the middle phase. Therefore, the phase area shifted to the more retardant or advanced position with respect to the rotation phase which allows engine start can be used during engine operation.

Further, according to the present invention, after engine start, the movable guide is immediately urged to move to the position in the area from the direction turning point to another or second end, which is the same in phase as the rotation phase which allows engine start, achieving smooth and quick phase control after engine start.

Still further, according to the present invention, only need to be considered when designing the shape of the spiral guide is motion of the corresponding link, having the advantage that the shape of the spiral guide can be simplified.

Furthermore, according to the present invention, since the biasing device comprises a spring, a stable biasing force can provide to the operating rotator even with simple structure.

Further, the operating rotator is operated in accordance with a balance between a force of the biasing device and a braking force of the electromagnetic brake, allowing simplified structure as compared with when adopting an electric motor or the like as electromagnetic actuator.

Having the present invention in connection with the preferred embodiment, it is noted that the present invention is not limited thereto, and various changes and modifications can be made without departing from the scope of the present invention.

The entire teachings of Japanese Patent Application P2003-422267 filed Dec. 19, 2003 are hereby incorporated by reference.

What is claimed is:

1. A valve timing control apparatus for an internal combustion engine, comprising:
    a driving rotator to which a torque is transmitted from crankshaft of the engine;
    a driven rotator that transmits the torque to a camshaft of the engine;
    a plate including at least one groove having a diameter that varies when followed circumferentially of the plate;
    at least one link that swingably couples the driving rotator and the driven rotator;
    a protrusion provided at the link and fitted in the groove such that when the plate is driven to rotate, the protrusion moves along the groove and also moves radially to cause a relative phase angle between the driving rotator and the driven rotator;
    an actuator that drives the plate to rotate; and
    a controller that controls the actuator, wherein:
    the groove includes first and second regions providing different change characteristics of the relative phase angle, and
    the controller controls the actuator so as to position the protrusion within the first region of the groove during cranking operation of the engine, and to position the protrusion within the second region of the groove after cranking operation of the engine.

2. The valve timing control apparatus as claimed in claim 1, wherein each of the at least one groove is formed in a spiral shape.

3. The valve timing control apparatus as claimed in claim 1, wherein each of the at least one groove includes a region in which the diameter decreases.

4. The valve timing control apparatus as claimed in claim 1, wherein each of the at least one groove includes a region in which the diameter increases.

5. The valve timing control apparatus as claimed in claim 1, wherein each of the at least one groove includes a region in which the diameter increases and a region in which the diameter decreases.

6. The valve timing control apparatus as claimed in claim 1, wherein the actuator is a hysteresis brake.

7. The valve timing control apparatus as claimed in claim 1, wherein the actuator is an electric motor.

8. The valve timing control apparatus as claimed in claim 1, wherein the actuator is an electromagnetic brake.

9. The valve timing control apparatus as claimed in claim 1, further comprising biasing means for applying a biasing force to the plate in a predetermined direction.

10. The valve timing control apparatus as claimed in claim 1, further comprising a spring that applies a biasing force to the plate in a predetermined direction.

11. The valve timing control apparatus as claimed in claim 1, further comprising a power spring that applies a biasing force to the plate in a predetermined direction.

12. The valve timing control apparatus as claimed in claim 9, wherein, while the plate is not being driven, the plate is positioned by the biasing force of the biasing means such that the protrusion is substantially at a position at which the diameter changes.

13. The valve timing control apparatus as claimed in claim 1, further comprising a radial guide that allows the protrusion to move along a radial groove for guiding radial movement.

14. The valve timing control apparatus as claimed in claim 1, wherein the protrusion is an engagement pin that is rollingly engaged in the groove.

15. The valve timing control apparatus as claimed in claim 1, wherein the protrusion is inserted into a hole or a depression formed in the link.

16. The valve timing control apparatus as claimed in claim 1, wherein the protrusion includes a spring therein, energized to the groove by the protrusion.

17. A valve timing control apparatus for an internal combustion engine, comprising:
    a driving rotator to which a torque is transmitted from a crankshaft of the engine;
    a driven rotator that transmits the torque to a camshaft of the engine;
    a plate including a plurality of grooves each having a diameter that varies when followed circumferentially of the plate;
    a plurality of links each of which swingably couples the driving rotator and the driven rotator;
    a plurality of protrusions each of which is provided at a respective one of the links and fitted in a respective one of the grooves such that when the plate is driven to rotate, each of the protrusions moves along the groove and also moves radially to cause a relative phase angle between the driving rotator and the driven rotator; and
    an actuator that drives the plate to rotate, wherein:
    each of the grooves includes a turning point, wherein different change characteristics of the relative phase angle are provided on first and second sides of the turning point; and
    the plate is driven to rotate such that each of the protrusions moves through the turning point of a respective one of the grooves during a period from a time in cranking operation of the engine to a time after cranking operation of the engine.

* * * * *